US011789996B2

(12) United States Patent
Weigel et al.

(10) Patent No.: US 11,789,996 B2
(45) Date of Patent: *Oct. 17, 2023

(54) NUANCED-COLOR SEARCH AND RECOMMENDATION SYSTEM

(71) Applicant: eBay Inc., San Jose, CA (US)

(72) Inventors: John Weigel, San Jose, CA (US); Niaz Ahamed Khaja Nazimudeen, Fremont, CA (US); Padmapriya Gudipati, San Jose, CA (US); Timothy Keefer, San Jose, CA (US); Fujun Zhong, Saratoga, CA (US); Ashmeet Singh Rekhi, Campbell, CA (US); Kenneth Crookston, Mlada Boleslav (CZ); Shane Lin, Mountain View, CA (US); Suchitra Ramesh, San Jose, CA (US); Rodolfo Gonzales, San Francisco, CA (US); Atiq Islam, San Jose, CA (US)

(73) Assignee: EBAY INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/738,284

(22) Filed: May 6, 2022

(65) Prior Publication Data

US 2022/0262095 A1 Aug. 18, 2022

Related U.S. Application Data

(63) Continuation of application No. 16/899,696, filed on Jun. 12, 2020, now Pat. No. 11,367,274, which is a
(Continued)

(51) Int. Cl.
*G06F 16/583* (2019.01)
*G06T 7/90* (2017.01)
*G06F 16/951* (2019.01)

(52) U.S. Cl.
CPC ........ *G06F 16/5838* (2019.01); *G06F 16/951* (2019.01); *G06T 7/90* (2017.01); *G06T 2207/10024* (2013.01)

(58) Field of Classification Search
CPC ..... G06F 16/951; G06F 16/5838; G06T 7/90; G06T 2207/10024; G06Q 30/00; G06Q 30/0621; G06Q 30/0631
See application file for complete search history.

(56) References Cited

U.S. PATENT DOCUMENTS 6,282,362 B1 8/2001 Murphy et al.
6,925,205 B2 8/2005 Leedham et al.
(Continued)

FOREIGN PATENT DOCUMENTS

WO 2002/047373 A2 6/2002
WO 2015/200523 A1 12/2015
WO 2019/055600 A1 3/2019

*Primary Examiner* — Daniel G Mariam
(74) *Attorney, Agent, or Firm* — SHOOK, HARDY & BACON L.L.P.

(57) ABSTRACT

Embodiments of the present disclosure provide systems, methods, and computer storage media for implementing a nuanced-color search and recommendation system. Employing various techniques described herein, an improved search engine for categorizable items is provided to generate accurate color-based search results and recommendations that are relevant to a nuanced color provided as a search parameter. In various implementations, digital assets that depict categorizable items can be analyzed to characterize the depicted items with, among other things, a particular shade of a determined dominant color. In this way, categorizable items can be searched based at least in part on a selected shade of a particular dominant color to generate a primary search result. In further embodiments, other categorizable items can be generated as recommendations based on characteristics of the primary search result. That is, other items
(Continued)

not necessarily subject of the search, can be provided as recommended items if predefined rules dictate that such items may complement the categorizable items included in the primary search result.

20 Claims, 9 Drawing Sheets

(3 of 9 Drawing Sheet(s) Filed in Color)

Related U.S. Application Data continuation of application No. 15/836,260, filed on Dec. 8, 2017, now Pat. No. 10,706,317.

(60) Provisional application No. 62/558,321, filed on Sep. 13, 2017.

(56) References Cited

U.S. PATENT DOCUMENTS

| | | |
|---|---|---|
| 7,187,386 B2 | 3/2007 | Rice et al. |
| 7,515,744 B2 | 4/2009 | Okutsu et al. |
| 8,576,241 B1 | 11/2013 | Kanter et al. |
| 9,047,633 B2 | 6/2015 | Gershon et al. |
| 9,442,973 B1 | 9/2016 | Tuan et al. |
| 9,652,868 B2 | 5/2017 | Gunningham et al. |
| 9,727,983 B2 | 8/2017 | Dorner et al. |
| 10,176,398 B2 | 1/2019 | Carroll et al. |
| 10,706,317 B2 | 7/2020 | Weigel et al. |
| 11,367,274 B2 | 6/2022 | Weigel et al. |
| 2007/0036371 A1 | 2/2007 | Buil et al. |
| 2010/0036883 A1 | 2/2010 | Valencia-Campo et al. |
| 2010/0181340 A1 | 7/2010 | Wallace et al. |
| 2013/0249934 A1 | 9/2013 | Gershon et al. |
| 2013/0300761 A1 | 11/2013 | Ahmed |
| 2015/0039994 A1 | 2/2015 | Hoguet |
| 2017/0228137 A1 | 8/2017 | Carlos et al. |
| 2019/0080198 A1 | 3/2019 | Weigel et al. |
| 2020/0320333 A1 | 10/2020 | Weigel et al. |

FIG. 5

NUANCED-COLOR SEARCH AND RECOMMENDATION SYSTEM

CROSS-REFERENCE TO RELATED APPLICATIONS

The present application is a continuation of U.S. application Ser. No. 16/899,696, filed on Jun. 12, 2020, which claims priority from U.S. application Ser. No. 15/836,260, filed on Dec. 8, 2017, which claims priority from U.S. Provisional Patent Application No. 62/558,321, filed Sep. 13, 2017, all of which are assigned or under obligation of assignment to the same entity as this application, the entire contents of these applications being herein incorporated by reference.

The patent or application file contains at least one drawing executed in color. Copies of this patent or patent application publication with color drawing(s) will be provided by the Office upon request and payment of the necessary fee.

BACKGROUND

Search engines are ubiquitous in online consumer-facing systems. Various industries including retail, news, research, and rich media, among many others, employ search engines to facilitate the expedient processing of search queries to generate relevant search results. In many implementations, these systems store searchable data as records in a database or another comparable structure. In various implementations, records can be structured in accordance with a defined database schema that includes, among other things, titles, categories, subcategories, prices, dates, or any other definable characteristic associated with a record and its contents. To facilitate a more relevant search result, search engine user interfaces can be implemented to present a user with pre-defined fields that are limited to one or more search parameters corresponding to one or more record characteristics. That is, search engines can provide options that facilitate user-provided search parameters limited to one or more desired characteristics of a search result.

SUMMARY

Embodiments of the present disclosure relate to a search and recommendation system. More specifically, systems and methods are disclosed relating to techniques that facilitate automated categorization and searches of categorizable items based on their nuanced color characteristics, among other things. As digital assets, such as digital images or videos, are oftentimes stored in or referenced by records in a database, characterizing these records by determining a dominant color and a shade of the determined dominant color can provide a more robust search engine and recommendation system.

In an embodiment, a digital asset that depicts a categorizable item is obtained. The digital asset can be analyzed to determine a dominant color in a plurality of dominant colors for the categorizable item depicted in the digital asset. As a dominant color in the plurality of dominant colors is typically not precise enough to accurately characterize the depicted categorizable item, a shade in a plurality of shades associated with the determined dominant color for the categorizable item can also be determined. A record that corresponds to the categorizable item can therefore be updated to reference, among other things, the determined shade of the determined dominant color.

In a further embodiment, the digital asset can be analyzed to determine a second most dominant color in a plurality of dominant colors for the categorizable item depicted in the digital asset. Similar to a dominant color, a second most dominant color is typically not precise enough to accurately characterize the depicted categorizable item, another shade in a plurality of shades associated with the determined second most dominant color for the categorizable item can also be determined. The record that corresponds to the categorizable item can therefore be updated to reference, among other things, the determined shade of the determined second most dominant color.

In another embodiment, a set of search parameters having at least a first search parameter can be received from a client device. By way of example, the first search parameter can reference a particular shade selected from a plurality of shades associated with one of a plurality of dominant colors. A search query can be generated based on the received set of search parameters, and subsequently processed to generate a primary search result. In this regard, a set of code can be generated such that, when rendered, at least a portion of the primary result is presented. In further embodiments, a secondary search result can also be generated based on the generated primary search result. The set of code can be generated such that, when rendered, at least a portion of the secondary result is also presented with or in lieu of the primary search result. In various embodiments, the secondary search result can include different records (e.g., recommendations) that are associated with another shade that complements the selected shade.

In a further embodiment, the set of search parameters having at least the first search parameter as well as a second search parameter can be received from a client device. By way of example, the second search parameter can reference another particular shade selected from a plurality of shades associated with one of a plurality of dominant colors. The search query can be generated based on the received set of search parameters, and subsequently processed to generate a primary search result. In this regard, a set of code can be generated such that, when rendered, at least a portion of the primary result is presented. In further embodiments, a secondary search result can also be generated based on the generated primary search result. The set of code can be generated such that, when rendered, at least a portion of the secondary result is also presented with or in lieu of the primary search result. In various embodiments, the secondary search result can include different records (e.g., recommendations) that are associated with shades that complement the selected shades.

In another embodiment, a reference to one or more pixels selected from a plurality of pixels associated with a digital asset can be received. Each referenced pixel for the digital asset can be analyzed to determine a corresponding one of a plurality of dominant colors associated therewith. As a dominant color is typically not precise enough to accurately characterize each referenced pixel, one of a plurality of shades of a determined dominant color associated with each referenced pixel can also be determined. The determined shade of each referenced pixel can be employed as a search parameter, when conducting a search for categorizable items characterized with the same one or more determined dominant colors and/or shades, for instance. In this regard, a search query that is generated based on, among other things, the determined shade of the one or more referenced pixels, can be processed to generate a search result. A set of code can be generated such that, when rendered, at least a portion of the generated search result can be presented.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The patent or application file contains at least one drawing executed in color. Copies of this patent or patent application publication with color drawing(s) will be provided by the Office upon request and payment of the necessary fee. The present disclosure is described in detail below with reference to the attached drawing figures, wherein:

FIG. 5 is another illustration of an exemplary graphical user interface in accordance with some embodiments of the present disclosure;

DETAILED DESCRIPTION

Figure 1:
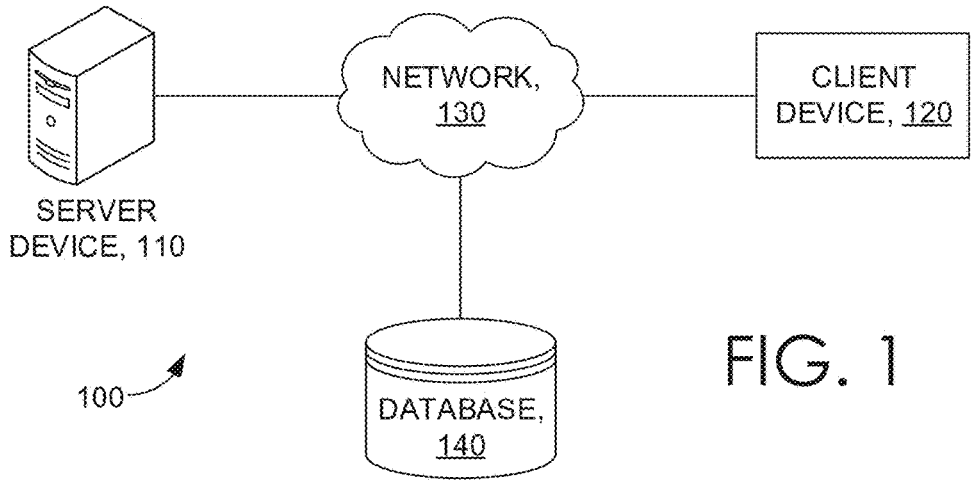
FIG. 1 depicts an exemplary operating environment in accordance with some embodiments of the present disclosure.

Search engines employed in various applications generally rely on the accuracy of the data being searched to generate relevant search results based on received search parameters. Oftentimes, the searchable data is stored in databases or similar storage structures as individual records. Databases and similar technologies can facilitate expedient searches on stored data by structuring records based on their defined characteristics. For instance, a corpus of stored data can include a very large number of unique records. To facilitate the organization of these records, additional fields can be added to or associated with a record, which can characterize the record as being part of a subset of the data. By way of example only, adding or associating records with one of a plurality of categories can facilitate an easy filtering of the data into various subsets. By further adding or associating the records with one of a plurality of subcategories associated with a corresponding category, further filtration of the data into deeper subsets of the various subsets can be facilitated. This characterization of records is considered standard practice in relational database maintenance, and facilitates the ability to easily filter data to provide relevant search results in response to a database query, particularly in the search context.

Though relational databases provide improved efficiencies to the organization and improved querying of data, the technology still relies on the accuracy of the data that characterizes the records. In other words, the association of records to a particular record characteristic is still prone to human error. By way of example, when new records are entered into a database, the records are typically entered manually or are parsed from static descriptions that may not accurately characterize the record. To this end, records that are inaccurately associated with a particular record characteristic can end up in a search result intended to produce relevant records that should, in fact, be associated with the particular record characteristic.

Some search engines may find utility in providing users with the ability to search records based on visible characteristics, particularly when most or all records include or reference a digital asset (e.g., an image, moving image, video, visual media). The accuracy of record characteristics (e.g., the nuanced color characteristics) becomes even more important in implementations where the digital asset is entirely relevant to an associated record (e.g., the digital asset depicts an item). Entities that provide consumer-facing search engines to search their data have made attempts to include color characteristics in their search engine implementations. However, the accuracy of this data is still vulnerable to the fallacies noted above, namely human error, parsing errors, missing or inaccurate descriptions, and the like. Moreover, densely-populated databases that do not already have a color-based record characteristic would be extremely time-consuming, and difficult, to update accurately and efficiently. In detail, data entry requires an extended duration of time, which directly translates into an extended usage of computing resources (e.g., electricity, processing power). As these conventional methods are prone to the various fallacies described above, an improvement to database record characteristic identification (e.g., colors of images stored or referenced in a database) for automated record characteristic updating, and an improved method for searching such records, would not only mitigate computing resource consumption, but can also improve the technology of search technology as a whole.

Embodiments of the present disclosure provide, among other things, techniques that provide for a highly accurate and an automated visual characterization of items depicted in digital assets stored in or referenced by records stored in a database. More specifically, the described techniques can provide significant resource savings when updating records in a database to accurately characterize nuanced-colors of the items depicted in digital assets associated with the records. By determining, for a categorizable item depicted in one or more digital assets, a dominant color of a plurality of dominant colors, and a shade of a plurality of shades associated with the determined dominant color, a record for the categorizable item can be created and/or updated to reference an accurate characterization of the item's nuanced color (e.g., the particular shade of the determined dominant color). In this way, a search engine for items can be implemented to generate relevant search queries and results based on a particular shade of a plurality of shades associated with one of a plurality of dominant colors.

In some further embodiments, by determining a second most dominant color of the plurality of dominant colors, and a shade of the plurality of shades associated with the determined second most dominant color, a record for the categorizable item can be created and/or updated to reference an accurate characterization of the item's nuanced colors (e.g., the particular shade of the determined dominant color and determined second most dominant color). In this way, a search engine for items can be implemented to generate relevant search queries and results based on the particular shades associated with each determined dominant color.

In some further embodiments, a determination of a pattern (e.g., argyle, gingham, plaid, striped, polka dot) can be performed for the categorizable item depicted in the one or more digital assets, such that a record for the categorizable item can be created and/or updated to reference an accurate characterization of the item's pattern. In this way, the search engine for items can be implemented to generate relevant search queries and results based not only on the determined shades of each determined dominant color (e.g., dominant and second most dominant), but further on a pattern associated therewith.

In some aspects, a search query can be generated based on a received set of search parameters. The received set of search parameters can include, among other search parameters, a reference to one or more shades selected from a plurality of shades, each associated with one of a plurality of dominant colors. Each selected shade can, in some instances, be selected as one of a primary selected shade or a secondary selected shade. In some further instances, the search parameter can further include other visual characteristics (e.g., a pattern) apart from or in addition to the selected one or more shades. For instance, a color palette presenting the various shades of the various dominant colors can be provided for display to a user device. One or more selected shades can be received from the user device as a search parameters in a set of received search parameters. A search query can be generated based on the received set of search parameters, and processed to generate a primary search result based on at least the selected one or more shades and/or patterns. That is, based on the generated search query, a primary search result can be generated to include only records with items that are characterized with the selected one or more shades, and with any other characteristics (e.g., pattern) if defined in another search parameter in addition to the selected shade. In further aspects, a secondary search result can also be generated based on the generated primary result. That is, based on the generated primary search result, a secondary search result can be generated to include records with items that are characterized with one or more different shades that are predefined as being "complementary" to the selected one or more shades. In some further aspects, the secondary search result can be generated to include records with items that are characterized with an association to a category and/or subcategory that is also predefined as being "complementary" to one or more categories and/or subcategories of records included in the primary search result.

In some other aspects, a reference to one or more pixels selected from a plurality of pixels associated with a digital asset can be received from a client device. A dominant color of a plurality of dominant colors, and a shade of a plurality of shades associated with the determined dominant color can be determined for each referenced pixel. In this way, the determined one or more shades, among other things, can be employed to generate a search query. The generated search query can be processed to generate a search result that is based at least in part on the determined one or more shades. That is, based on the generated search query, a search result can be generated to include only records with items that are characterized with the one or more shades determined for each referenced pixel, and with any other characteristics if defined in another search parameter in addition to the referenced pixel. By way of example, a user device can be employed to upload or send a reference (e.g., URL) for a digital asset to a server. The digital asset can be provided for display on the client device with a color picker or other tool that facilitates a selection of one or more pixels (e.g., a pixel with primary selected shade, a pixel with secondary selected shade) from the plurality of pixels associated with the digital asset. The server can receive, from the client device, a reference to the selected one or more pixels as a search parameter, along with any other search parameters if provided. The server can determine, for each selected pixel based on the received reference thereto, a dominant color and a shade associated with the determined dominant color. The determined one or more shades can be employed to generate a search query that, when processed, includes only records with items that are characterized with the one or more shades determined for each referenced pixel. In some instances, if two shades are selected or included in a set of search parameters (e.g., a primary selected shade, a secondary selected shade) for processing as a search query, one of the shades (e.g., the primary selected shade) can be searched as a dominant shade, while the other shade (e.g., the secondary selected shade) can be searched as a second most dominant shade.

Turning now to FIG. 1, a schematic depiction is provided illustrating one exemplary operating environment 100 of which an embodiment of the present disclosure can be employed. It should be understood that this and other arrangements described herein are set forth only as examples. Other arrangements and elements (e.g., machines, interfaces, functions, orders, groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The operating environment 100 of FIG. 1 includes a server device 110 that provides a service to one or more client devices, such as client device 120, for hosting and searching records (e.g., posts, webpages, entries, submissions, database records) corresponding to categorizable items over a network 120, such as the Internet. A categorizable item, as referred to herein, can include any item or service that can be described literally, or tagged, with one or more definable characteristics. By way of example, categorizable items can include services, art, licenses, tickets, access codes, antiques, paraphernalia, or other tangible or intangible assets or goods. It is contemplated, however, that a categorizable item in accordance with the present disclosure can be depicted via one or more digital assets (e.g., images, moving images, videos) that can provide a visual representation of the categorizable item.

The server device 110 is coupled, directly or indirectly, to a database 140 for facilitating the storage and querying of records corresponding to a plurality of categorizable items. The database 140 includes, among other things, a relational database or similar storage structure accessible by the server device 110. In accordance with embodiments described herein, the database 140 stores a plurality of records that each corresponds to a categorizable item. Although not depicted in FIG. 1, a record stored in database 140 includes a plurality of fields that store, among other things, definable characteristics of a categorizable item that corresponds to the record. A definable characteristic of a categorizable item can include, among other things, data or a reference (e.g., link, URI) to data comprising a description, a digital asset, a category and/or subcategory, a determined dominant color for the categorizable item depicted in the digital asset, a determined shade of the determined dominant color for the depicted categorizable item, any other characterizing label or code, or any combination thereof. The database 140 stores a plurality of records that corresponds to different, similar, and/or identical categorizable items in such a manner that each record corresponding to a categorizable item has at least one unique identifier associated therewith.

The server device 110 includes a web server for hosting a website accessible by client device 120 and/or a data server for supporting an application of client device 120, over the network 130. The hosted website and/or data server can support any type of website and/or application, respectively, including those that are transactional in nature. The server device 110 further provides a search engine that can be accessed by client device 120, for generating and processing search queries on database 140 based on search parameters received from client device 120. The search parameters can include any characteristic of a categorizable item, or a portion of any such characteristic (e.g., keyword(s)). In accordance with various embodiments described herein, a characteristic can include a category, subcategory, selected pattern, uploaded pattern, genre, name, time frame, and many other descriptive terms, keywords, or visual characteristics. Responsive to a set of search parameters received from client device 120, the server device 110 generates a search query based on the received set of search parameters. The server device 110 further processes the generated search query to generate a set of search results. In various embodiments, the server device 110 communicates the set of search results, or at least a portion thereof, to the client device 120 for presentation thereon.

Figure 2:
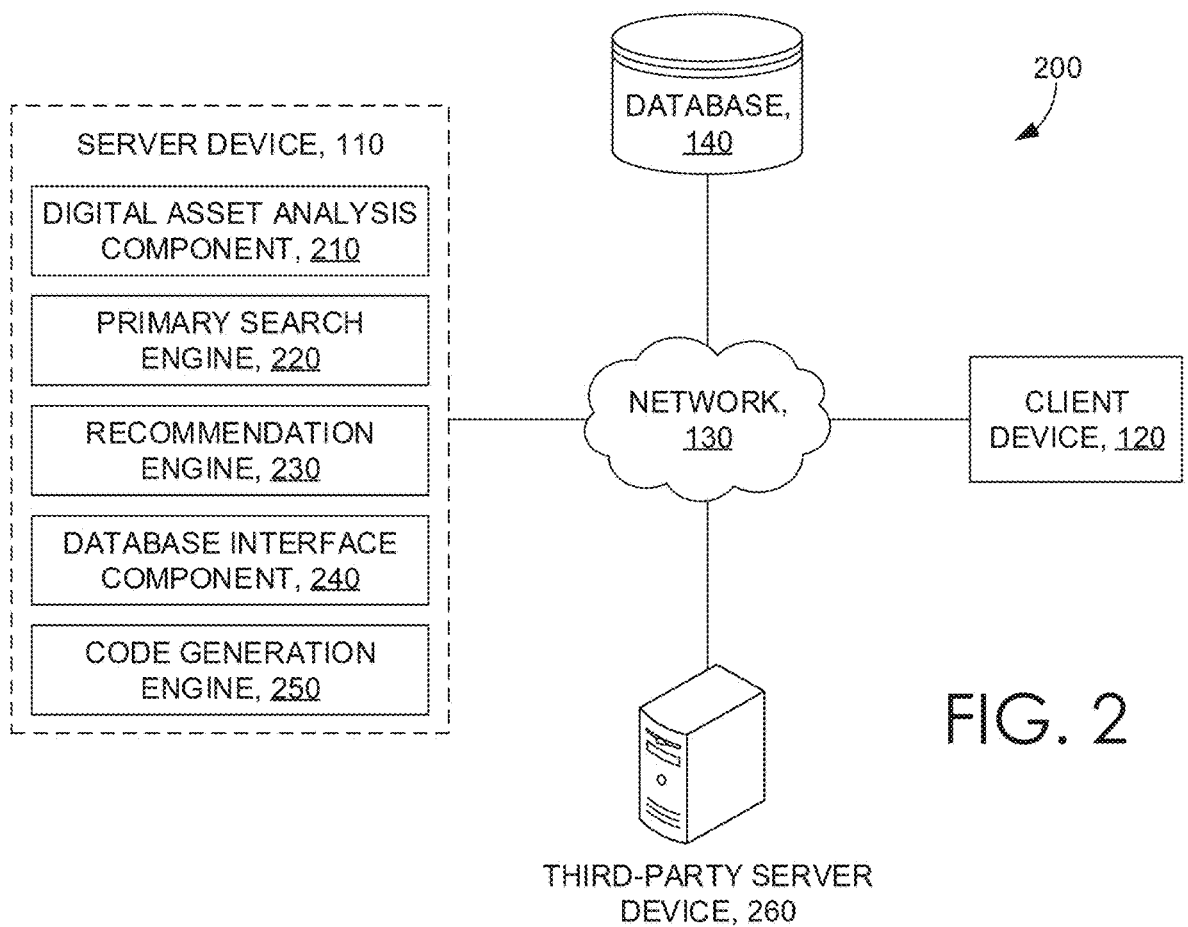
FIG. 2 is a block diagram illustrating an exemplary implementation of the nuanced color search and recommendation system in accordance with some embodiments of the present disclosure.

Referring now to FIG. 2, a block diagram 200 is provided illustrating a system in accordance with some embodiments of the present disclosure. The block diagram 200 depicts an exemplary implementation of the server device 110 described in FIG. 1, in accordance with some embodiments disclosed herein. It is noted that the depicted implementation is merely exemplary, and not intended to be limiting in any way, as each component can be arranged in various configurations, spread across a number of computing devices, combined with other components or one another, arranged to communicate over a network, or any combination of the foregoing including others not mentioned.

In one aspect, the server device 110 includes a digital asset analysis component 210 that can obtain one or more digital assets to be analyzed, and determine characteristics of one or more pixels or a categorizable item depicted therein. In various embodiments, to obtain the one or more digital assets, the one or more digital assets can be retrieved from a memory (not shown), retrieved from database 140, received from client device 120, or retrieved from a referenced location (e.g., a URI). As described, a record stored in database 140 can include, among other things, one or more digital assets, or references to the one or more digital assets, that each depict a categorizable item that corresponds to the record. As referenced herein, any characteristic (e.g., a digital asset) "included" in a record can be the actual characteristic itself or a reference to the characteristic (e.g., a memory location, file location, pointer, URI).

The digital asset analysis component 210 can include one or more modules that facilitate various graphical analysis operations described herein. For instance, the digital asset analysis component 210 can identify a categorizable item depicted in at least one of the digital assets included in a corresponding record. The digital asset analysis component 210 can further determine, for the identified categorizable item, a visual characteristic (e.g., a dominant color, a second most dominant color, a pattern). Based on the visual characteristic of the categorizable item being determined the digital asset analysis component 210 can further determine, for the identified categorizable item, a shade of a determined dominant (or second most dominant) color from a plurality of shades associated with the determined dominant color.

In this way, the digital asset analysis component 210 can determine a particular shade of a determined dominant color for a categorizable item that either corresponds to a record stored in database 140, or will correspond to a new record for storage in database 140. The digital asset analysis component 210, or some other component of the server device 110, can then employ a means to modify the database 140, such as database interface component 240, to update or create the record in database 140. A record in database 140 can be updated with the determined shade characteristic, among other characteristics determined, by associating at least the determined shade of the determined dominant color with the record, or in essence, with the categorizable item depicted in a digital asset included in the record.

In some embodiments, the digital asset analysis component 210 can determine, for a selected pixel of a digital asset, a dominant color from a plurality of predefined or well-known dominant colors. Based on the dominant color of the selected pixel being determined, the digital asset analysis component 210 can further determine, for the selected pixel, the shade of the determined dominant color from a plurality of shades associated with the determined dominant color.

In this way, the digital asset analysis component 210 can determine a particular shade of a determined dominant color for a pixel selected from a digital asset, such as one provided by (e.g., uploaded) or referenced by a user via client device 120. The digital asset analysis component 210 can then employ a means to search the database 140, such as primary search engine 220, to generate a primary search result that only includes records corresponding to categorizable items having been characterized with the particular shade of the selected pixel.

In some embodiments, the digital asset analysis component 210 can perform a color correction on the digital asset before a dominant color or shade thereof is determined. By way of example only, a policy may be imposed requiring any and all digital assets stored and/or referenced by the server device 110 to include, with the depicted categorizable item, a fixed color emblem or logo having known color values. That is, an emblem or logo having uniform and definite color value(s) may be required to be depicted alongside or attached to the categorizable item depicted in the digital asset. In this way, a color correction algorithm can reference the depicted emblem or logo to perform a color-correction operation on the entire image, such that any variations in ambient or flash lighting can be adjusted for uniformity. It is contemplated that the foregoing example is not intended to be limiting, and any other technique of color correction can be employed within the purview of the present disclosure.

In another aspect, the server device 110 can include a primary search engine 220 that can receive a set of search parameters from a client device, such as client device 120. The primary search engine 220 can generate a search query based on the received set of search parameters, and further process the search query to generate a primary search result, as was described with respect to the search engine feature of server device 110 in FIG. 1. Provided that each record (or at least a portion of the records) of database 140 includes a determined shade of a determined dominant color, among other things, for a corresponding categorizable item, the primary search engine 220 can receive one of a plurality of shades associated with one of a plurality of dominant colors as a search parameter. The determined shade can be employed to generate a limited search query to be processed by the server device 110. In some instances, provided that another characteristic (e.g., second most dominant color) is determined for a categorizable item, it is contemplated that the primary search engine 220 can also receive, among other things, a different shade in the plurality of shades associated with the second most dominant color as another search parameter included in the set of search parameters.

In this regard, a user employing user device 120 can conduct a search on records stored in database 140, and limit a primary search result to records corresponding to categorizable items having been characterized with a particular shade associated with a particular dominant color, among other things described herein. When the received set of search parameters includes another search parameter (e.g., a category, subcategory, pattern, second most dominant color, other characteristic), the primary search result can be limited to certain records and categorizable items having been characterized with the particular shade and also having been associated with the other search parameters (e.g., the category, subcategory, pattern, second most dominant color, other characteristic), if applicable.

In a further aspect, the server device 110 can also include a recommendation engine 230 that can generate a secondary search result. In some embodiments, the secondary search result can be generated by the recommendation engine 230 based on at least a portion of a primary search result, such as the primary search result generated by primary search engine 220. The secondary search result can include one or more records that each corresponds to a categorizable item that is determined to "complement" (e.g., go well with, coordinate well with, match) one or more of the categorizable items included in the primary search result.

More specifically, the recommendation engine 230 can generate a secondary search query based at least in part on a portion of the characteristics associated with the records of the primary search result. For instance, the recommendation engine 230 can generate the secondary search query by referencing a set of predefined rules that correspond to one or more characteristics associated with records in a primary search result.

By way of example, assume that a particular shade of brown is included as a sole search parameter communicated to primary search engine 220. Following, the generated primary search result would only include records corresponding to categorizable items having been characterized with the particular shade of brown. As no additional search parameters other than the particular shade of brown were provided, the recommendation engine 230 may reference a set of predefined rules to a identify a rule that defines a particular "tan" shade as being a complementary color to the particular shade of brown. In this regard, the recommendation engine 230 can generate and process a search query that references the particular "tan" shade, thereby generating a secondary search result that would only include records corresponding to categorizable items having been characterized with the particular "tan" shade. In various embodiments, one or more records of the secondary search result can be presented independent of, in conjunction with, or in lieu of, the primary search result. In further embodiments, the one or more records of the secondary search result can be presented as a recommended categorizable item that "complements" one or more of the categorizable items corresponding to at least a portion of the primary search result records.

Following on the previous example, assume that a particular category "handbag" is included as a secondary search parameter communicated to primary search engine 220. Following, the generated primary search result would only include records corresponding to categorizable items having been characterized with both the particular shade of brown and the association to the "handbag" category. In this regard, the recommendation engine 230 may reference the set of predefined rules a identify a first rule that defines a particular "tan" shade as being a complementary color to the particular shade of brown, and a second rule that defines the "shoe" category as being a complementary category to the "handbag" category. It is further contemplated that a combination rule defining both a particular shade and particular category as being complementary to the searched shade and category, together. In this regard, the recommendation engine 230 can process a search query that is generated based on both the particular "tan" shade and the "shoe" category, thereby generating a secondary search result that would only include records corresponding to categorizable items having been characterized with the particular "tan" shade and with to the "shoe" category. In various embodiments, the secondary search result can be presented independent of, in conjunction with, or in lieu of, the primary search result.

As the foregoing examples are merely exemplary, it is contemplated that the recommendation engine 230 and predefined rules can be implemented in a variety of ways. That is, any combination of characteristics can be considered independently or in combination with one another, and the predefined rules can be structured to reference one or more characteristics for searching based on a variety of primary search result characteristics or combinations thereof.

In various embodiments, the server device 110 can include a database interface component 240 that provides an interface or API connection between the various components of the server device 110 and database 140. That is, the database interface component 240 can facilitate the communication of search queries to and search results from the database 140. In some embodiments, the database interface component 240 can be operable to generate SQL queries, scripts, or other methods of parsing records based on search parameters provided thereto. While database 140 is depicted as being separate from server device 110, it is contemplated that database 140 can be included in server device 110 in accordance with some embodiments described herein.

In some embodiments, the server device 110 can include a code generation engine 250 that generates a set of code that is renderable by a client device, such as client device 120, to present thereon one or more graphical user interfaces (GUIs), search results, tools, or other graphical elements necessary to enable client device 120 to send communications to and/or receive communications from server device 110. The foregoing features in accordance with some described embodiments are also referenced herein as "presentation aspects." Further, any reference to a feature where the server device 110 "provides for display" a described presentation aspect can correspond to the generation of code that is renderable by the client device 120 to facilitate the presentation of the described presentation aspect.

In various embodiments, the set of code can include any type of data that can facilitate the proper presentation of information generated by server device 110 on client device 120. By way of example, the set of code can include XML code, HTML/HTML5 code, JavaScript, Flash, ActionScript, or any other code or data that can be received by a browser, application, operating system, or other service that facilitates a proper rendering of information received by client device 120 and from server device 110.

In some other embodiments, the code generation engine 250 can be an instruction engine (not shown) that generates a set of instructions that are interpretable by the client device and/or an application executing thereon. In this regard, a set of instructions can be communicated to a client device, such as client device 120, to facilitate any one or more of the presentation aspects described herein. Such embodiments may be applicable to implementations where an application (e.g., a mobile application or desktop application) executing on a client device includes renderable or interpretable code facilitating the presentation features described herein. Further, any reference to a feature where the server device 110 "provides for display" a described presentation aspect can correspond to the communication of one or more instructions that are interpretable by the client device 120 to facilitate the presentation of the described presentation aspect. It is also contemplated that, in accordance with some other embodiments, the server device 110 can include a combination of the code generation engine 250 and the instruction engine to facilitate any one or more of the presentation aspects described herein.

Figure 3:
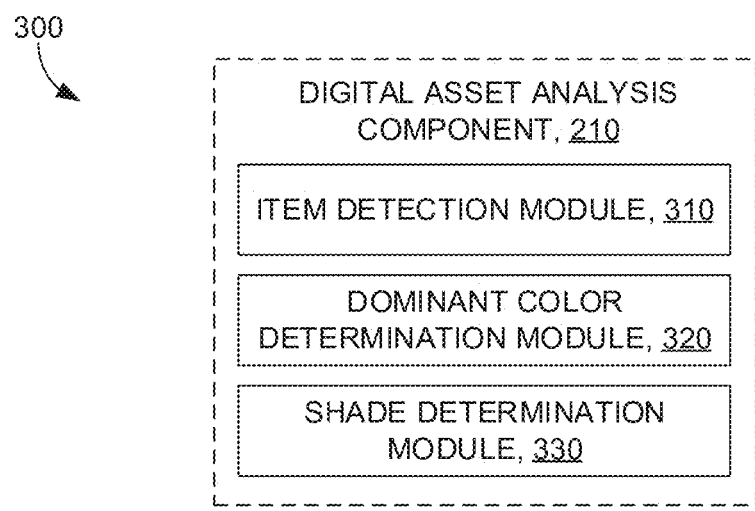
FIG. 3 is a block diagram illustrating an exemplary implementation of a digital asset analysis component in accordance with some embodiments of the present disclosure.

Looking now to FIG. 3, a block diagram 300 is provided to illustrate an exemplary implementation of a digital asset analysis component 210 in accordance with some embodiments of the present disclosure. The block diagram 300 depicts an exemplary implementation of the digital asset analysis component 210 described in FIG. 2. It is noted that the depicted implementation is merely exemplary, and is not intended to be limiting in any way, as each component can be arranged in a variety of configurations, spread across a number of computing devices, combined with other components, arranged to communicate over a network, or any combination of the foregoing including others not mentioned.

As was described in with reference to FIG. 2, the digital asset analysis component 210 can include one or more modules that facilitate various graphical analysis operations described herein. The digital asset analysis component 210 can include an item detection module 310 that can identify a categorizable item depicted in at least one of the digital assets included in a particular record. By way of example only, the item detection module 310 may identify substantial changes in contrast, sharpness, and/or color characteristics to determine a focal point of the digital asset. By doing so, the item detection module 310 may be able to identify the categorizable item. In another example, the item detection module 310 may identify a dominant set of pixels having a set of colors that are within a close range (e.g., mostly red) that contrasts with a background of the digital asset having a different set of colors. By doing so, the item detection module 310 may be able to identify or extract the categorizable item depicted in a digital asset. As the foregoing examples are merely exemplary, it is contemplated that any technique for identifying a categorizable item depicted in a digital asset can be employed.

The digital asset analysis component 210 can also include a dominant color determination module 320 that can determine, for one or more pixels associated with a digital asset, a dominant color from a plurality of predefined or well-known dominant colors. In some further embodiments, the dominant color determination module 320 can further determine, for one or more different pixels associated with the digital asset, a second most dominant color from the plurality of predefined or well-known dominant colors. In accordance with various embodiments described herein, any process described with regards to the dominant color determination module 320 can also be employed to determine a second most dominant color. In such embodiments, it is contemplated that pixels associated with the first most dominant color are ignored or removed when the second most dominant color is determined thereafter. As such, any process of method described relating to a dominant color or dominant color determination module 320 can also be viewed in accordance with a second most dominant color.

The dominant color determination module 320 can be provided with a set of pixels to analyze and determine that the set of pixels correspond to a dominant color, among other things. In an embodiment, the dominant color determination module 320 can be provided with the set of pixels corresponding to the categorizable item identified by the item detection module 310. In another embodiment, the dominant color determination module 320 can be provided with a selected pixel of a plurality of pixels associated with a digital asset. In this regard, and by way of a non-limiting example, the dominant color determination module 320 can determine that a majority or a predefined percentage of the pixels in the provided set of pixels (or in some cases a selected pixel) has a color value that is closest (e.g., in color value) to a known dominant color value.

In accordance with embodiments described herein, a dominant color can be any color that is defined as having a "pure hue," as one of ordinary skill in the art may appreciate. In this regard, a dominant color value can be any color value that corresponds to the dominant color, based on a particular color space or color system employed by embodiments described herein. A color space or system can include RGB, CMYK, HSL, HSV, YIQ, YPbPr, xvYCC, CIELAB, CIEXYZ, or any other color space or system. By way of example only, the dominant color "red" may have a dominant color value of [255,0,0] in the RGB color space, and having a hex value of "FF0000."

The digital asset analysis component 210 can also include a shade determination module 330 that can determine, based on a dominant color determined by the dominant color determination module 320, a particular shade of the determined dominant color. By way of example only, the shade determination module 330 can determine, for one or more pixels associated with a digital asset, a particular shade of a plurality of shades associated with the determined dominant color (e.g., the dominant color determined by dominant color determination module 320). The shade determination module 330 can be analyze at least a portion of the same set of pixels to determine that the set of pixels corresponds to one of the plurality of shades associated with the determined dominant color. By way of a non-limiting example, the shade determination module 330 can determine that a majority or a predefined percentage of the pixels in at least a portion of the set of pixels (or in some cases the selected pixel) has a color value that is closest (e.g., in color value) to one of a plurality of shades in a plurality of shades associated with the determined dominant color value.

In accordance with embodiments described herein, a color shade or "shade" can be any color that is defined as having a slight variation from a "pure hue" but remaining associated with the pure hue. That is, for example, the color pink can be a shade of red, but cannot be a shade of blue. Further, while navy can be a shade of blue, it cannot be a shade of red. As referenced herein, a "shade" can include a variation of a dominant color, either being darkened or lightened. The term "shade" is not to be limiting in the sense that it is utilized in contrast with "tint." As referenced herein, a determined "shade" can include either a "tint" or a "shade" of a hue as formally defined in certain industries, as one of ordinary skill in the art may appreciate. In accordance with embodiments described herein, a shade value associated with a dominant color value can be any color value that varies from, but is associated with a dominant color value, based on the particular color space or color system employed by embodiments described herein. As was described herein as an example, the dominant color "red" may have a dominant color value of [255, 0, 0] in the RGB color space, and having a hex value of "FF0000." In this regard, a shade of the dominant color "red" can include "pink," which may have a shade value of [255, 204, 204] in the RGB color space, and having a hex value of "FFCCCC."

Although not depicted, the digital asset analysis component 210 can also include a pattern determination module (not shown), which can be provided with the set of pixels to analyze and determine that the set of pixels correspond to a particular pattern, among other things. In an embodiment, the pattern determination module can be provided with the set of pixels corresponding to the categorizable item identified by the item detection module 310. In this regard, and by way of a non-limiting example, the pattern determination module can determine that a majority or a predefined percentage of the pixels in the provided set of pixels (or in some cases a selected area of an image) has a pattern that is most similar to a known pattern. While not described herein in detail, it is contemplated that a pattern can be determined utilizing various technologies, such as object recognition, pixel analysis, and more.

Figure 4:
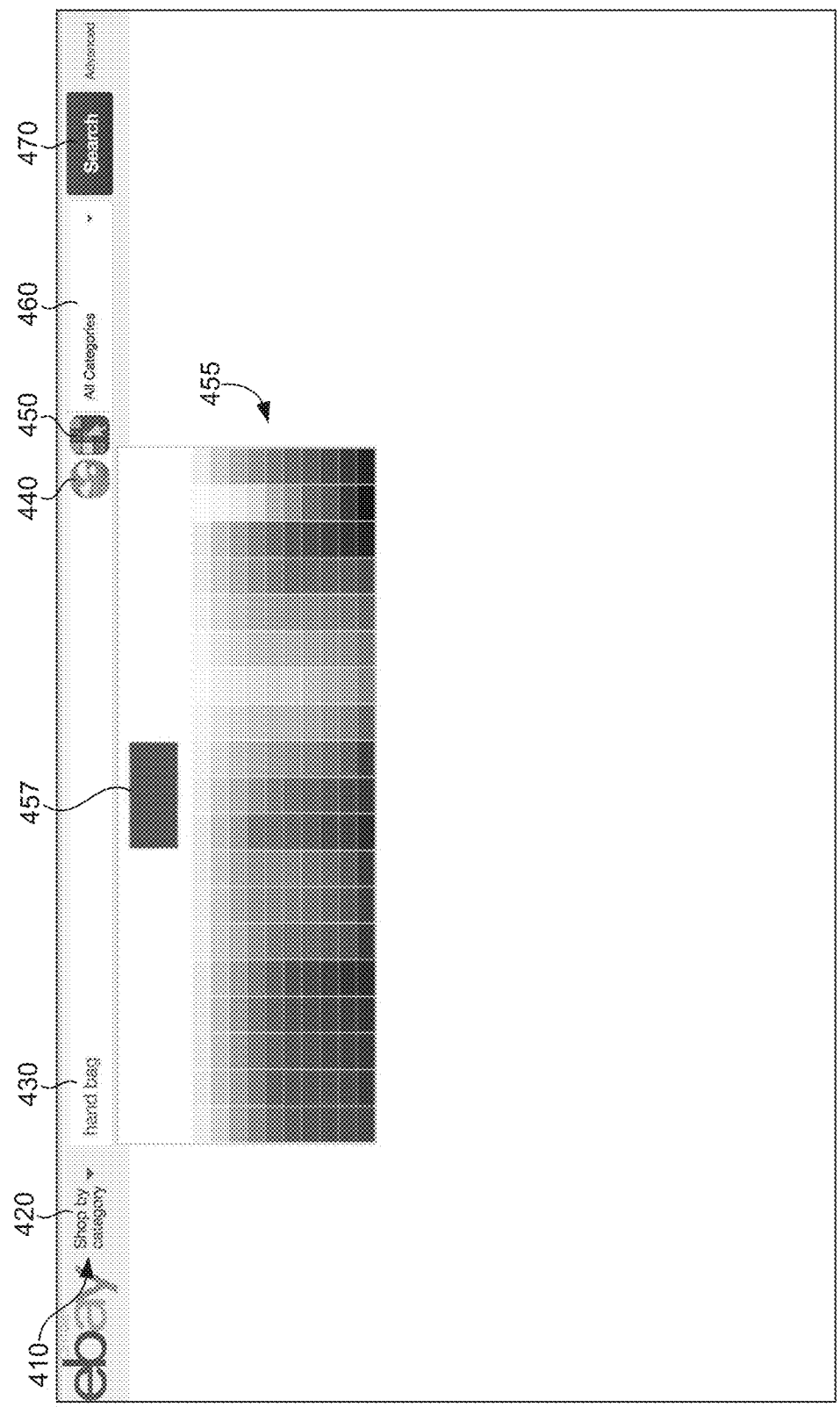
FIG. 4 is an illustration of an exemplary graphical user interface in accordance with some embodiments of the present disclosure.

Looking now to FIG. 4, an exemplary graphical user interface (GUI) 400 is provided to illustrate an exemplary implementation of the nuanced-color search and recommendation system in accordance with embodiments described herein. It is noted that the depicted implementation is merely exemplary, and is not intended to be limiting in any way, as the depicted graphical elements can be arranged in a variety of configurations, spread across a number of GUIs or webpages, combined with other graphical elements, limited to one or more of the depicted graphical elements, or any combination of the foregoing including others not mentioned.

The illustrated GUI 400 depicts at least a portion of a GUI that is displayed by a client device, such as client device 120 of FIG. 2. The GUI 400 can be rendered and/or populated by the client device based on code generated by a component of the server device, such as code generation engine 250 in FIG. 2. The GUI can be presented as a webpage or an application, among other things. As illustrated, GUI 400 depicts a search area 410 having interactable elements or fields, such as a category quick selection drop-list 420, a keyword or key phrase form field 430, a custom image color palette tool 440, a color palette selection tool 450, a category search parameter drop-list 460, and a search parameter(s) submission button 470.

Any one of fields 420, 430, 440, 450, and 460 can be interacted with to define one of a set of search parameters to be communicated to the server device, such as server device 110, by the client device 120. In this regard, a user employing client device 120 can define a set of search parameters that can be communicated to the server device upon the detection of an input corresponding to the search parameter submission button 470. It is contemplated that any one of fields 420, 430, 440, 450, and 460 can be employed independently to submit a single search parameter, or in combination with one another. However, it is further contemplated that custom image color palette tool 440 and a color palette selection tool 450 perform similar functions, and may not be employed in combination according to some implementations.

As was described, a user employing client device 120 can define at least one keyword or key phrase as a search parameter via keyword or key phrase form field 430 that, when submitted to the server device, is employed to determine if the keyword or key phrase corresponds to at least a portion of a characteristic associated with one or more categorizable items or records thereof. A keyword or key phrase can define a search parameter that the server device can employ to generate a search query that, when processed, searches a database of records, such as database 140 of FIG. 2. In various embodiments, the server device can define and/or limit the various fields of records that can be searched. For instance, the database interface component 240 may be employed to define the scope of a generated search query (e.g., limiting the search to defined record characteristics).

As was also described, the category search parameter drop-list 460 can be employed by a user of client device 120 to define a single search parameter alone or in combination with one or more additional search parameters. As the category search parameter drop-list 460 is pre-populated with selectable parameters and is limited to categories and/or subcategories, any search parameter submission including a selection from the category search parameter drop-list 460 can result in a generated search query that is limited to categorizable items corresponding to records having been characterized with the selected category.

Looking now at color palette selection tool 450, an icon or graphic representative of the tool can be presented such that, when interacted with, a color palette 455 is presented on the GUI 400. The color palette 455 includes each dominant color of the plurality of dominant colors, as depicted on the bottom row. Each dominant color corresponds to a single column of the presented color palette 455, such that shades of the dominant color become progressively lighter moving vertically upwards the corresponding column. The illustrated color palette 455 configuration is not intended to be limiting in any way, and any configuration of the color palette 455 can be presented in accordance with the embodiments described herein.

When the color palette 455 is presented on the client device, any one of the presented shades of the color palette 455 can be interacted with. That is, the GUI 400 can detect an interaction received from an input device (e.g., a mouse or finger touch to a touchscreen) to a shade. In some embodiments, a selected shade GUI element 457 can be presented on the client device to show either a particular shade being interacted with (e.g., a mouse-over event detected thereon), or a particular shade that has been selected (e.g., a mouse-click event received thereon). The selection of a particular shade from the color palette 455 can define one of the set of search parameters that can be communicated to the server device from the GUI 400.

Similar to that of the category search parameter drop-list 460, the color palette selection tool 450 can be employed by a user of client device 120 to define a single search parameter alone or in combination with one or more additional search parameters. As the color palette selection tool 450 is pre-populated with selectable parameters (e.g., shades) and is limited to the shades associated with a predefined plurality of dominant colors, any search parameter submission including a selection from the color palette selection tool 450 can result in a generated search query that is limited to categorizable items corresponding to records having been characterized with the selected shade.

Looking now to FIG. 5, another exemplary graphical user interface (GUI) 500 is provided to illustrate an exemplary implementation of the nuanced-color search and recommendation system in accordance with embodiments described herein. It is noted that the depicted implementation is merely exemplary, and is not intended to be limiting in any way, as the depicted graphical elements can be arranged in a variety of configurations, spread across a number of GUIs or webpages, combined with other graphical elements, limited to one or more of the depicted graphical elements, or any combination of the foregoing including others not mentioned.

The illustrated GUI 500 depicts at least a portion of a GUI that is displayed by a client device, such as client device 120 of FIG. 2. The GUI 500 can be rendered and/or populated by the client device based on code generated by a component of the server device, such as code generation engine 250 in FIG. 2. The GUI 500 can be presented on the client device as a webpage or application, among other interactive interfaces. As illustrated, GUI 500 depicts a primary search result portion 510 presenting at least a portion of a primary search result generated by the server device 110, and a secondary search result portion 530 presenting at least a portion of a secondary search result generated by the server device 110. As noted, the primary search result and the secondary search result can be presented together or independent from one another, in accordance with various implementations described herein. For instance, and by way of example, a GUI that presents only categorizable items included in a primary search result may include a link that, when interacted with, causes a presentation of the secondary search result. In other words, the categorizable items that are determined as being complementary to the categorizable items of the primary search result may be viewed based on a detected interaction.

The illustrated GUI 500 further depicts a shade array 520 that presents each shade of color that is associated with at least the presented portion of the primary search result. In some embodiments, the shade array 520 can present each shade of color that is associated with all categorizable items of the primary search result. While not depicted in FIG. 5, it is contemplated that any one of the presented shades in shade array 520 can be interacted with (e.g., clicked) to further filter the primary search results, and in some instances the secondary search results as well. That is, a selected shade of one of the presented shades in shade array 520 can be selected via detected interaction, which can cause the client device to responsively submit, to the server device, a narrowed search parameter including any one or more search parameters from which the presented primary search result is based on, and further including the selected shade.

In this regard, though not illustrated, a new primary search result can be presented, limiting the primary search result to include only records corresponding to categorizable items having been associated with the selected shade.

Figure 6:
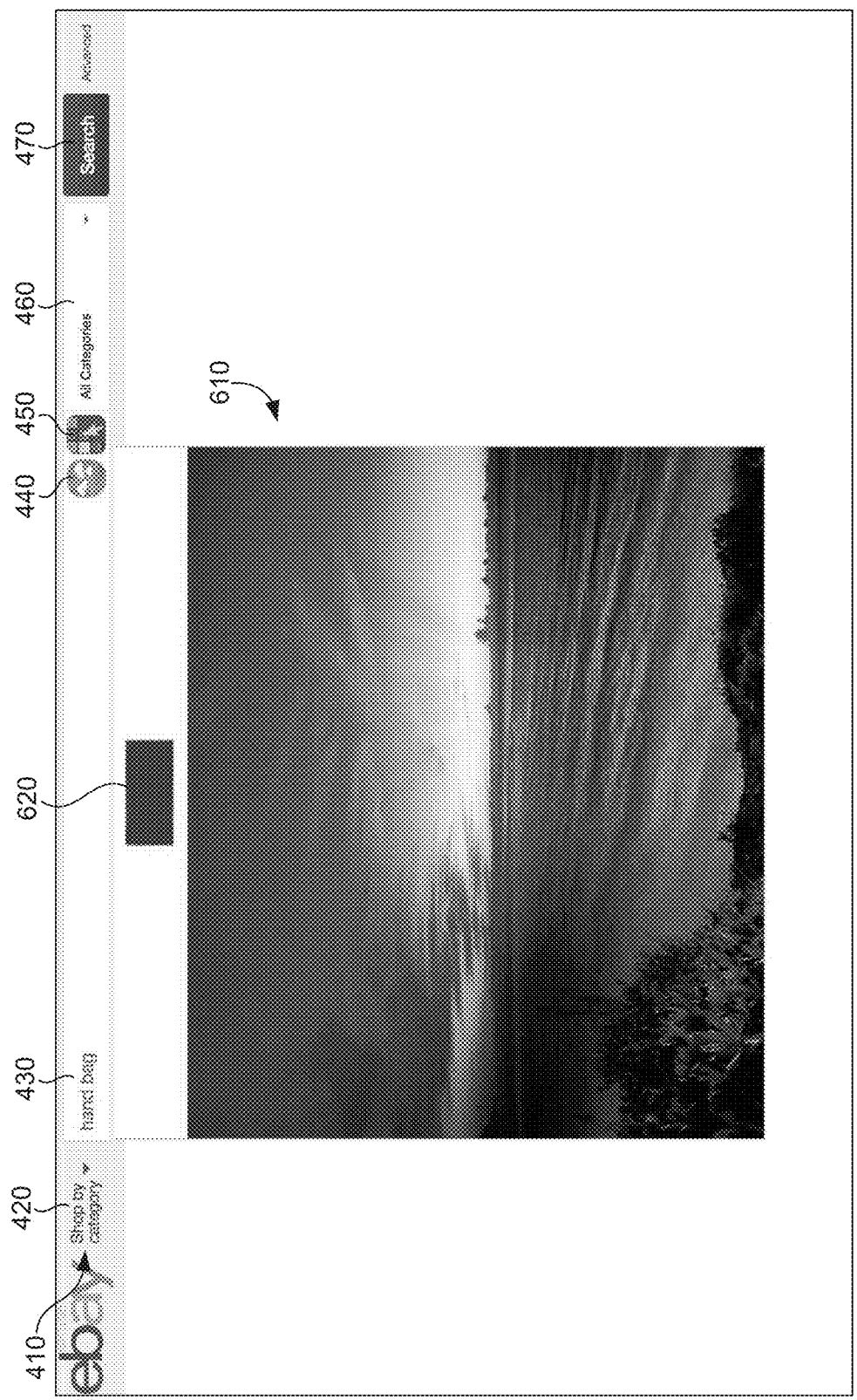
FIG. 6 is another illustration of an exemplary graphical user interface in accordance with some embodiments of the present disclosure.

Looking now to FIG. 6, another exemplary graphical user interface (GUI) 600 is provided to illustrate an exemplary implementation of the nuanced-color search and recommendation system in accordance with embodiments described herein. It is noted that the depicted implementation is merely exemplary, and is not intended to be limiting in any way, as the depicted graphical elements can be arranged in a variety of configurations, spread across a number of GUIs or webpages, combined with other graphical elements, limited to one or more of the depicted graphical elements, or any combination of the foregoing including others not mentioned.

The illustrated GUI 600 depicts at least a portion of a GUI that is displayed by a client device, such as client device 120 of FIG. 2. The GUI 600 can be rendered and/or populated by the client device based on code generated by a component of the server device, such as code generation engine 250 in FIG. 2. The GUI 600 can be presented on the client device as a webpage or application, among other interactive interfaces. As illustrated, GUI 600 depicts the search area 410 having interactable elements or fields, such as the described category quick selection drop-list 420, keyword or key phrase form field 430, custom image color palette tool 440, color palette selection tool 450, category search parameter drop-list 460, and search parameter(s) submission button 470.

Looking now at custom image color palette tool 440, an icon or graphic representative of the tool 440 can be presented such that, when interacted with, a GUI element is presented on or separate from the GUI 600 (e.g., a pop-up). In some embodiments, the GUI element can include, among other things, a URL field and/or a file location field that can be defined. The URL field and/or file location field can receive a reference to a location of a digital asset that a user would like to employ as a color palette for the selection of a particular shade, such as was similarly facilitated by color palette selection tool 450 described in reference to FIG. 4. In some further embodiments, the GUI element can further include an interactive GUI element (e.g., a "Browse" button) that, when interacted with, can facilitate a selection of a locally-stored or locally-accessible digital asset. In some embodiments, a detected interaction with the interactive GUI element may launch a local file explorer or similar file management user interface. When a digital asset desired to be employed as a color palette is selected or referenced via client device 120, and submitted to the server device 110, the GUI element is closed and the server device 110 can obtain, retrieve, or receive the digital asset for temporary storage (e.g., in a cache). In some instances, the server device 110 does not need to actually obtain the digital asset, but can employ a memory or cache of the client device 120 to obtain and perform various functions on the digital asset.

When the digital asset is obtained, based on the received reference, the digital asset can be presented to the user as a custom image color palette 610. The presented custom image color palette 610 includes the digital asset referenced by the client device 120. In some implementations, the server device 110 or client device 120 can resize the digital asset so that when it is presented as the custom image color palette 610, the digital asset is presented within the confines of a predetermined area, such as is depicted by color palette 455 of FIG. 4 and custom image color palette 610 of FIG. 6.

When the custom image color palette 610 is presented on the client device, any one of the presented pixels of the custom image color palette 610 can be interacted with. That is, the GUI 600 can detect an interaction received from an input device (e.g., a mouse or finger touch to a touchscreen) to a particular pixel of the digital asset, or in other words, the custom image color palette 610. In some embodiments, a selected shade GUI element 620 can be presented on the client device to show either a particular shade of a pixel being interacted with (e.g., a mouse-over event detected thereon), or a particular shade of a pixel that has been selected (e.g., a mouse-click event received thereon). The selection of a particular pixel from the custom image color palette 610 can define a selected pixel as one of the set of search parameters that can be communicated to the server device from the GUI 600.

In an embodiment, a reference to the selected pixel can be submitted to the server device 110 as one of the set of search parameters. In this regard, the server device 110 can receive the reference to the selected pixel, and map the reference to the corresponding pixel on the obtained digital asset. In some embodiments, the server device 110 can employ a digital asset analysis component, such as digital asset analysis component 210 of FIGS. 2 and 3, to determine a dominant color of the referenced pixel and further determine, for the referenced pixel, a shade associated with the determined dominant color. To this end, the server device 110 can convert the reference to the selected pixel, in the set of received search parameters, into the determined shade, such that an appropriate search query can be generated and processed based on correctly-defined search parameters.

In another embodiment, the dominant color of the selected pixel can be determined locally on the client device (e.g., via code embedded in the GUI 600). Similarly, the shade of the dominant color, for the selected pixel, can also be determined locally on the client device. In such implementations, the determined shade itself can be submitted to the server device 110 from client device 120 as a correctly-defined search parameter, such that no conversion is necessary on the server device 110.

Similar to that of the category search parameter drop-list 460 of FIG. 4, the custom image color palette 610 can be employed by a user of client device 120 to define a single search parameter alone or in combination with one or more additional search parameters. As the color custom image color palette 610 is pre-populated with selectable parameters (e.g., shades and/or pixels) and is limited to the shades associated with the pixels in the digital asset, any search parameter submission including a reference or selection from the custom image color palette 610 can result in a generated search query that is limited to records corresponding to categorizable items having been characterized with the determined shade of the selected pixel.

Figure 7:
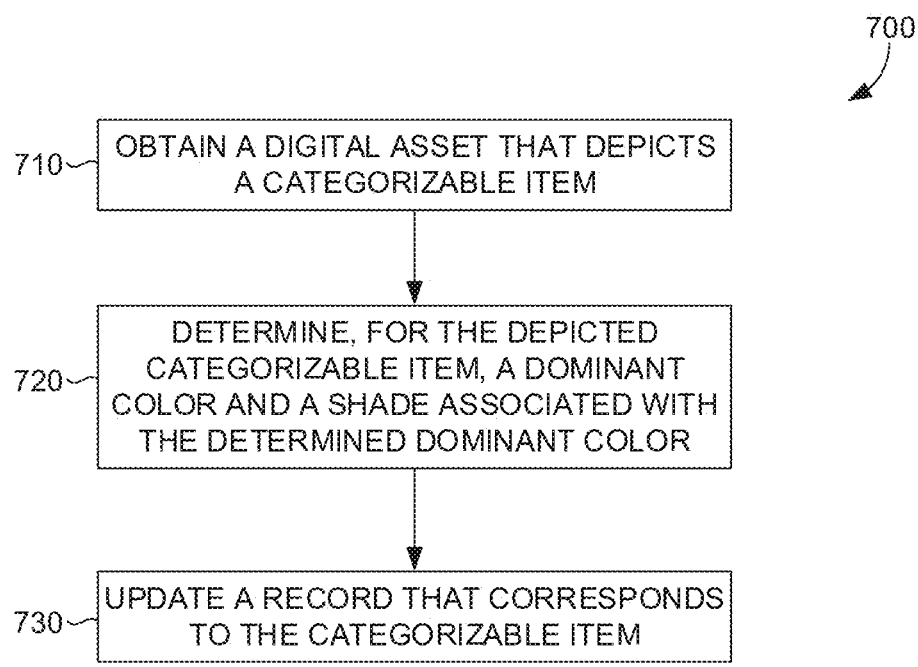
FIG. 7 illustrates a process flow depicting an example method for optimizing a database of categorizable items to operate with a nuanced-color search and recommendation system in accordance with some embodiments of the present disclosure.
Figure 8:
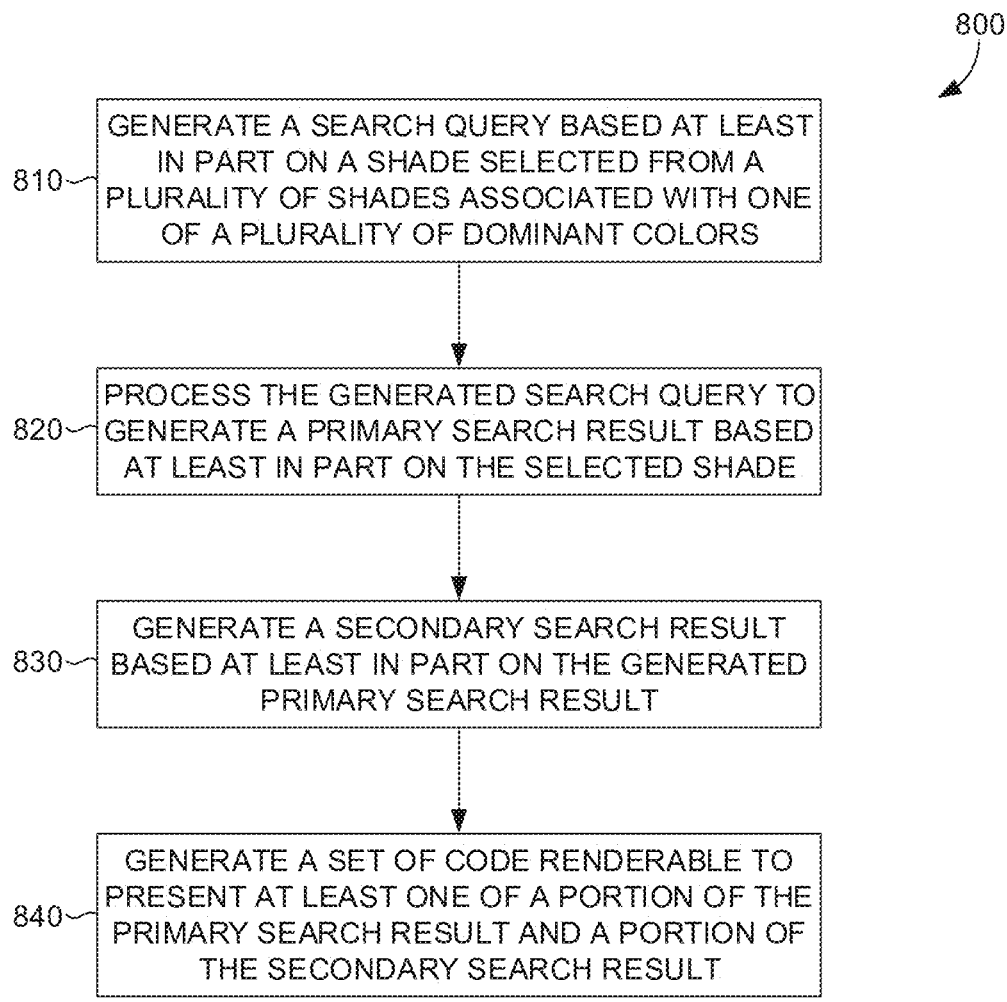
FIG. 8 illustrates a process flow depicting an example method for generating search results with a nuanced-color search and recommendation system in accordance with some embodiments of the present disclosure.
Figure 9:
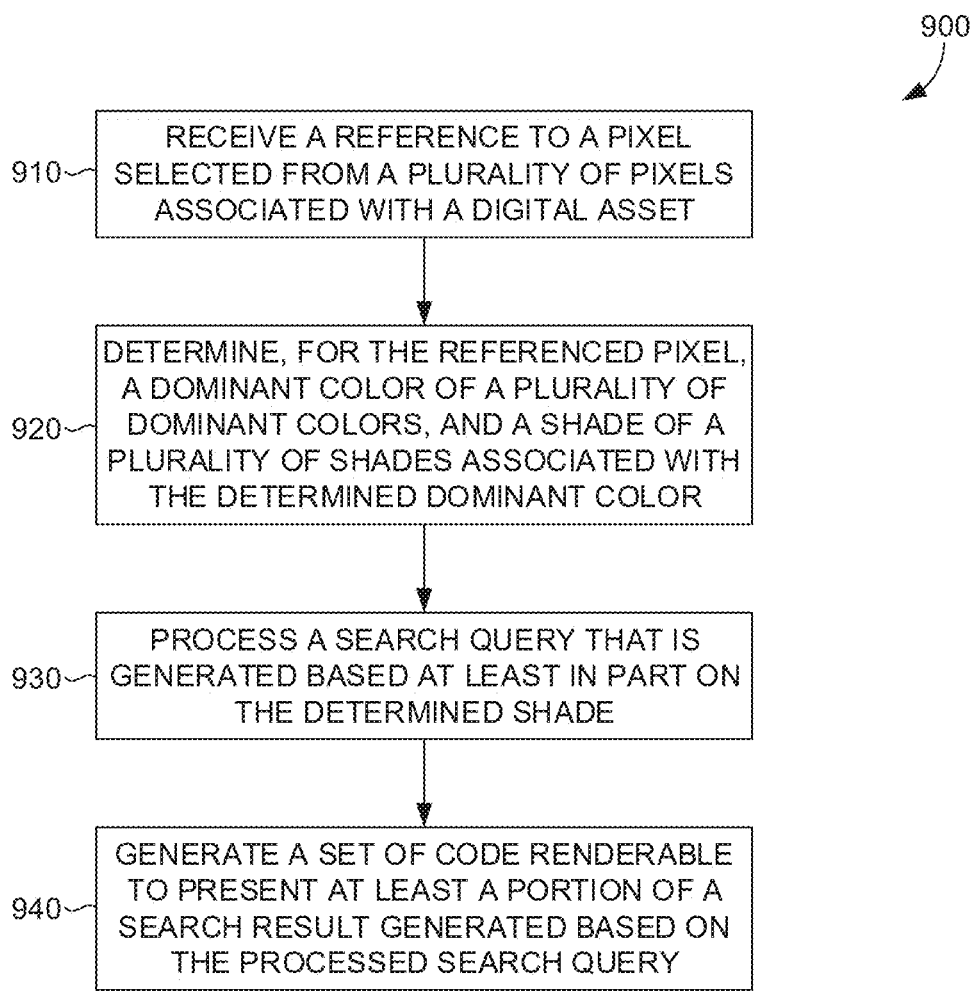
FIG. 9 illustrates a process flow depicting an example method for generating search results based on a selected pixel of a user-provided image with a nuanced-color search and recommendation system in accordance with some embodiments of the present disclosure.

With reference to FIGS. 7-9, flow diagrams are provided illustrating methods for implementing a nuanced-color search and recommendation system in accordance with embodiments described herein. The methods can be performed using the any one or more of the components or modules described herein. In embodiments, one or more computer storage media having computer-executable instructions embodied thereon that, when executed, by one or more processors, can cause the one or more processors to perform the methods in the nuanced-color search and recommendation system.

Looking now to FIG. 7, a flow diagram is provided showing an example process flow 700 for optimizing a database of categorizable items to operate with a nuanced-color search and recommendation system.

At block 710, one or more digital assets depicting a categorizable item is obtained. The asset(s) can be obtained by a server device, such as server device 110, and/or can be obtained from a client device, such as client device 120, or from a database, such as database 140.

At block 720, a dominant color of a plurality of dominant colors can be determined for the categorizable item depicted in at least a first digital asset of the obtained one or more digital assets. The dominant color can be determined by a digital asset analysis component, such as digital asset analysis component 210 of FIG. 3. Further, a shade of a plurality of shades associated with the determined dominant color can also be determined for the depicted categorizable item. Similarly, the shade can be determined by a digital asset analysis component, such as the digital asset analysis component 210 of FIG. 3.

Based at least in part on the shade being determined, at block 730, a record that corresponds to the categorizable item can be created or updated. The record can be created and/or updated to reference at least the determined shade. In various embodiments, the record can be created and/or updated on a database, such as database 140 of FIGS. 1-2.

Looking now to FIG. 8, a flow diagram is provided showing an example process flow 800 for generating search results with a nuanced-color search and recommendation system. At block 810, a search query is generated based on a received set of search parameters. The received set of search parameters can be received by a server device, such as server device 110, from a client device, such as client device 120. The set of search parameters can include a first search parameter that references, among other things, a shade selected from a plurality of shades associated with one of a plurality of dominant colors. The set of search parameters can include any number of search parameters in addition to the first search parameter, including a second shade selected from a plurality of shades associated with one of the plurality of dominant colors, a pattern selected from a plurality of known patterns, a category, a subcategory, or any other descriptive term that may be associated with a categorizable item.

At block 820, a generated search query can be processed by the server device 110. The search query can be generated based on the received set of search parameters. Processing of the generated search query can generate a primary search result that is based at least in part on the received set of search parameters including the first search parameter and any other search parameters included in the received set, if applicable. The primary search result can include any number of records that are determined to have characteristics that match or have a threshold similarity to one or more of the parameters included in the received set of search parameters.

At block 830, a secondary search result can further be generated based at least in part on the generated primary search result. That is, characteristics associated with the one or more records included in the generated primary search result can be employed to determine new search parameters employed to generate a second search query, thereby generating the second search result based at least in part on the generated primary search result. In some aspects, a set of rules or policies can be defined, particularly for generating secondary search queries based on one or more search results included in a generated primary search result. In this regard, one or more characteristics associated with one or more of the generated primary search results can be mapped to a corresponding rule or policy, which can reference a different characteristic that is known to complement the one or more mapped characteristics. In this way, a different set of search results can be generated to provide categorizable items that may complement the items provided in the primary search result based at least in part on the defined rules and policies.

At block 840, a set of code that is renderable to present one or both of the primary search or secondary search results, or portions thereof, can be generated by the server device 110 employing a code generation engine, such as code generation engine 250 of FIG. 2. In embodiments, the server device 110 can communicate the generated set of code to the client device 120 for presentation thereon. As described, the renderable code can include any type of code that can be interpreted and provided for display on a computing device, such as client device 120. The code can include static code, dynamic code, or even executable code, in accordance with various embodiments described herein.

Looking now to FIG. 9, a flow diagram is provided showing an example process flow 900 for generating search results based on a selected pixel of a user-provided image with a nuanced-color search and recommendation system. At block 910, a reference to a pixel selected from a plurality of pixels associated with a digital asset is received by a server device, such as server device 110, by a client device, such as client device 120. The reference to the pixel can be received via a GUI presented on the client device, such as GUI 600 of FIG. 6.

At block 920, a dominant color for the referenced pixel can be determined by the server device 110. That is, a dominant color of a plurality of dominant colors can be determined for the referenced pixel. The server device 110 can employ a digital asset analysis component, such as digital asset analysis component 210 of FIG. 3, to determine the dominant color of the referenced pixel. Further, based on the dominant color of the referenced pixel having been determined, the server device 110 can determine, for the referenced pixel, a shade of a plurality of shades associated with the determined dominant color. Similarly, the server device 110 can employ the digital asset analysis component 210 of FIG. 3 to determine the shade of the determined dominant color for the referenced pixel.

At block 930, a generated search query can be processed by the server device. The search query can be generated based at least in part on the shade that was determined for the referenced pixel in block 920. The search query can be generated based on the received set of search parameters. Processing of the generated search query can generate a primary search result that is based at least in part on the received set of search parameters including the first search parameter and any other search parameters included in the received set, if applicable. The primary search result can include any number of records that are determined to have characteristics that match or have a threshold similarity to one or more of the parameters included in the received set of search parameters.

At block 940, a set of code that is renderable to present at least a portion of a search result can be generated by the server device 110 employing a code generation engine, such as code generation engine 250 of FIG. 2. In embodiments, the server device 110 can communicate the generated set of code to the client device 120 for presentation of at least the portion of the search result thereon. As described, the renderable code can include any type of code that can be interpreted and provided for display on a computing device, such as client device 120. The code can include static code, dynamic code, or even executable code, in accordance with various embodiments described herein.

Having identified various component of the nuanced-color search and recommendation system 100, it is noted that any number of components may be employed to achieve the desired functionality within the scope of the present disclosure. Although the various components of FIGS. 1 and 2 are shown with lines for the sake of clarity, in reality, delineating various components is not so clear, and metaphorically, the lines may more accurately be grey or fuzzy. Further, although some components of FIGS. 1 and 2 are depicted as single components, the depictions are exemplary in nature and in number and are not to be construed as limiting for all implementations of the present disclosure. The nuanced-color search and recommendation system 100 functionality can be further described based on the functionality and features of the above-listed components.

Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Figure 10:
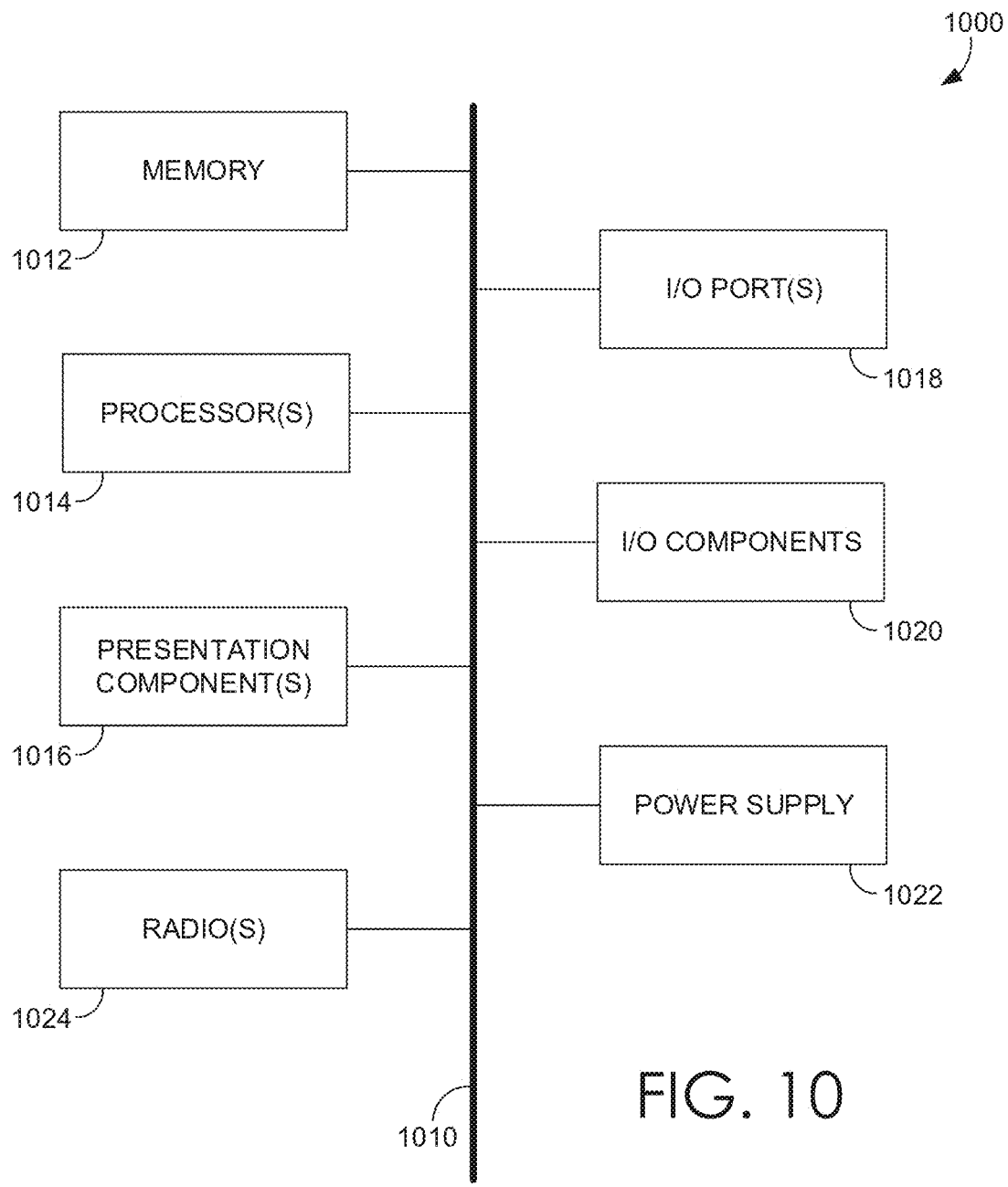
FIG. 10 is a block diagram of an example computing device in which some embodiments of the present disclosure may be employed.

Having described embodiments of the present disclosure, an exemplary operating environment in which embodiments of the present disclosure can be implemented is described below in order to provide a general context for various aspects of the present disclosure. Referring to FIG. 10, an illustrative operating environment for implementing embodiments of the present disclosure is shown and designated generally as computing device 1000. Computing device 1000 is but one example of a suitable computing environment and is not intended to suggest any limitation as to the scope of use or functionality of the invention. Neither should the computing device 1000 be interpreted as having any dependency or requirement relating to any one or combination of components illustrated.

Embodiments of the present disclosure can be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. Embodiments of the present disclosure may be practiced in a variety of system configurations, including hand-held devices, consumer electronics, general-purpose computers, more specialty computing devices, etc. Embodiments of the present disclosure may also be practiced in distributed computing environments where tasks are performed by remote-processing devices that are linked through a communications network.

With reference to FIG. 10, computing device 1000 includes a bus 1010 that directly or indirectly couples the following devices: memory 1012, one or more processors 1014, one or more presentation components 1016, input/output (I/O) ports 1018, input/output components 1020, and an illustrative power supply 1022. Bus 1010 represents what may be one or more busses (such as an address bus, data bus, or combination thereof). Although the various blocks of FIG. 10 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterates that the diagram of FIG. 10 is merely illustrative of an exemplary computing device that can be used in connection with one or more embodiments of the present disclosure. Distinction is not made between such categories as "workstation," "server," "laptop," "hand-held device," etc., as all are contemplated within the scope of FIG. 10 and reference to "computing device."

Computing device 1000 typically includes a variety of computer-readable media. Computer-readable media can be any available media that can be accessed by computing device 1000 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1000. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1012 includes computer-storage media in the form of volatile and/or nonvolatile memory. The memory may be removable, non-removable, or a combination thereof. Exemplary hardware devices include solid-state memory, hard drives, optical-disc drives, etc. Computing device 1000 includes one or more processors that read data from various entities such as memory 1012 or I/O components 1020. Presentation component(s) 1016 present data indications to a user or other device. Exemplary presentation components include a display device, speaker, printing component, vibrating component, etc.

I/O ports 1018 allow computing device 1000 to be logically coupled to other devices including I/O components 1020, some of which may be built in. Illustrative components include a microphone, joystick, game pad, satellite dish, scanner, printer, wireless device, etc. The I/O components 1020 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1000. The computing device 1000 may be equipped with depth cameras, such as stereoscopic camera systems, infrared camera systems, RGB camera systems, touchscreen technology, and combinations of these, for gesture detection and recognition. Additionally, the computing device 1000 may be equipped with accelerometers or gyroscopes that enable detection of motion. The output of the accelerometers or gyroscopes may be provided to the display of the computing device 1000 to render immersive augmented reality or virtual reality.

Embodiments presented herein have been described in relation to particular embodiments which are intended in all respects to be illustrative rather than restrictive. Alternative embodiments will become apparent to those of ordinary skill in the art to which the present disclosure pertains without departing from its scope.

From the foregoing, it will be seen that this disclosure in one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in a limiting sense, and the scope of embodiments is defined by the appended claims and their equivalents.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)." The phrase "at least one of A, B and C" means "(A), (B), (C), (A and B), (A and C), (B and C) or (A, B and C)."

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A computer-implemented method comprising:
   obtaining, by a computing device, a digital asset that depicts a categorizable item;
   determining, by the computing device, a dominant color of a plurality of dominant colors based on the categorizable item depicted in the digital asset;
   determining, by the computing device, a dominant shade of a plurality of shades of the dominant color based on the categorizable item depicted in the digital asset; and
   storing, by the computing device, the dominant shade of the plurality of shades of the dominant color to a database record that corresponds to the categorizable item.

2. The computer-implemented method of claim 1, wherein the digital asset includes one of a static image, a moving image, or a video.

3. The computer-implemented method of claim 1, further comprising:
   receiving, by the computing device, a search query that references the dominant shade;
   generating, by the computing device, a search result that includes the categorizable item based on the dominant shade being stored in the corresponding database record; and
   providing for display, by the computing device, at least a portion of the search result that depicts the categorizable item.

4. The computer-implemented method of claim 3, wherein the search query is received based on a selection made via a remote client device.

5. The computer-implemented method of claim 4, further comprising:
   providing for display, to the remote client device, a color palette including, for each dominant color of the plurality of dominant colors, the associated plurality of shades, each shade in the associated plurality of shades being selectable to define the search query.

6. The computer-implemented method of claim 1, wherein the dominant color and the dominant shade are determined based on a graphical analysis of the digital asset.

7. The computer-implemented method of claim 1, wherein the digital asset is defined in a first color space, wherein the dominant color and the dominant shade are each defined in a second color space, and wherein the determination of the dominant color and the dominant shade includes computing a nearest match conversion from the first color space to the second color space.

8. A non-transitory computer storage medium storing computer-useable instructions that, when used by one or more computing devices, cause the one or more computing devices to perform operations comprising:
   obtaining a digital asset that depicts a categorizable item;
   determining a dominant color of a plurality of dominant colors based on the categorizable item depicted in the digital asset;
   determining a dominant shade of a plurality of shades of the dominant color based on the categorizable item depicted in the digital asset; and
   storing the dominant shade of the plurality of shades of the dominant color to a database record that corresponds to the categorizable item.

9. The medium of claim 8, wherein the digital asset includes one of a static image, a moving image, or a video.

10. The medium of claim 8, the operations further comprising:
    receiving a search query that references the dominant shade;
    generating a search result that includes the categorizable item based on the dominant shade being stored in the corresponding database record; and
    providing for display at least a portion of the search result that depicts the categorizable item.

11. The medium of claim 10, wherein the search query is received based on a selection made via a remote client device.

12. The medium of claim 11, the operations further comprising:
    providing for display, to the remote client device, a color palette including, for each dominant color of the plurality of dominant colors, the associated plurality of shades, each shade in the associated plurality of shades being selectable to define the search query.

13. The medium of claim 8, wherein the dominant color and the dominant shade are determined based on a graphical analysis of the digital asset.

14. The medium of claim 8, wherein the digital asset is defined in a first color space, wherein the dominant color and the dominant shade are each defined in a second color space, and wherein the determination of the dominant color and the dominant shade includes computing a nearest match conversion from the first color space to the second color space.

15. A computerized system comprising:
    one or more processors; and
    one or more computer storage media storing computer-usable instructions that, when used by the one or more processors, cause the one or more processors to:
    obtain a digital asset that depicts a categorizable item;
    determine a dominant color of a plurality of dominant colors based on the categorizable item depicted in the digital asset;
    determine a dominant shade of a plurality of shades of the dominant color based on the categorizable item depicted in the digital asset; and
    store the dominant shade of the plurality of shades of the dominant color to a database record that corresponds to the categorizable item.

16. The system of claim 15, wherein the digital asset includes one of a static image, a moving image, or a video.

17. The system of claim 15, the instructions further causing the one or more processors to:
- receive a search query that references the dominant shade;
- generate a search result that includes the categorizable item based on the dominant shade being stored in the corresponding database record; and
- provide for display at least a portion of the search result that depicts the categorizable item.

18. The system of claim 17, wherein the search query is received based on a selection made via a remote client device.

19. The system of claim 18, the instructions further causing the one or more processors to:
- provide for display, to the remote client device, a color palette including, for each dominant color of the plurality of dominant colors, the associated plurality of shades, each shade in the associated plurality of shades being selectable to define the search query.

20. The system of claim 15, wherein the dominant color and the dominant shade are determined based on a graphical analysis of the digital asset.

\* \* \* \* \*